E. H. HERBERT.
THEATRICAL AUTOMOBILE RACE.
APPLICATION FILED FEB. 15, 1921.

1,400,818.

Patented Dec. 20, 1921.
3 SHEETS—SHEET 1.

INVENTOR
Elmer H. Herbert.
BY
Harry C. Schroeder
ATTORNEYS

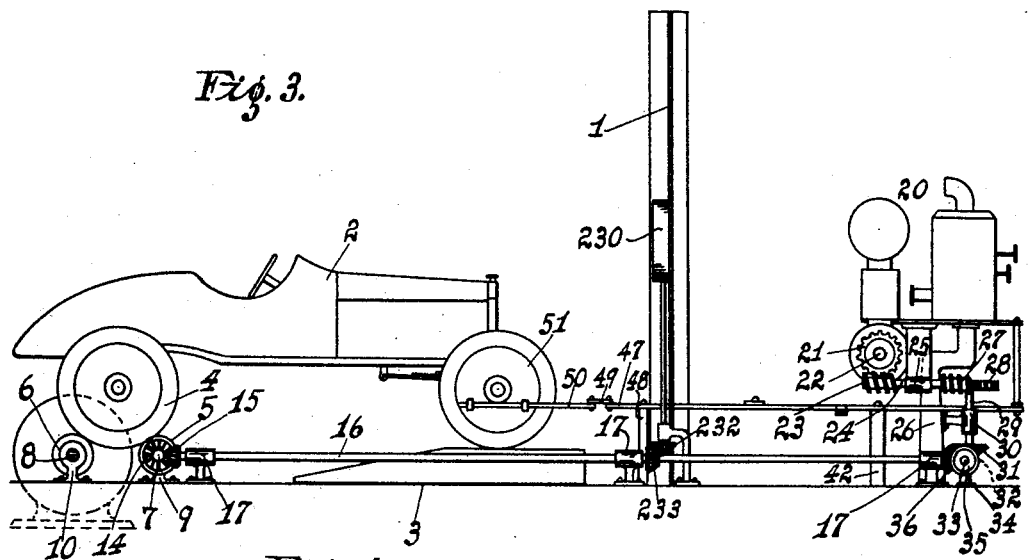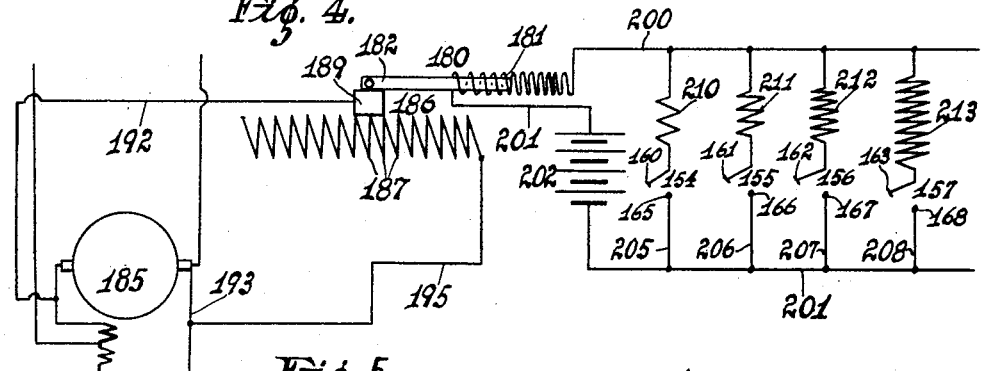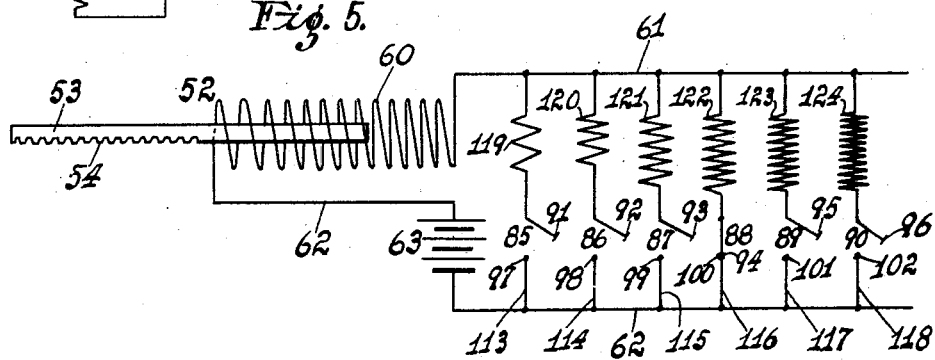

E. H. HERBERT.
THEATRICAL AUTOMOBILE RACE.
APPLICATION FILED FEB. 15, 1921.

1,400,818.

Patented Dec. 20, 1921.
3 SHEETS—SHEET 3.

Inventor
Elmer H. Herbert.

By Harry C. Schroeder
Attorney

UNITED STATES PATENT OFFICE.

ELMER H. HERBERT, OF OAKLAND, CALIFORNIA.

THEATRICAL AUTOMOBILE RACE.

1,400,818.  Specification of Letters Patent.  Patented Dec. 20, 1921.

Application filed February 15, 1921. Serial No. 445,237.

*To all whom it may concern:*

Be it known that I, ELMER H. HERBERT, a citizen of the United States, residing at Oakland, in the county of Alameda and State of California, have invented certain new and useful Improvements in Theatrical Automobile Races, of which the following is a specification.

My invention is a theatrical automobile race or tour which is exhibited in moving picture theaters, the automobile being mounted on the stage before the screen and forming part of the moving picture which shows the road over which the automobile appears to travel and the surrounding country.

Referring to the annexed drawing in which my invention is illustrated and which forms a part of this specification:

Fig. 3 is a side elevation of my invention, with certain parts removed.

Fig. 4 is a diagrammatic view of the road resistance controlling device.

Fig. 5 is a diagrammatic view of the picture shifting device.

Figure 1:
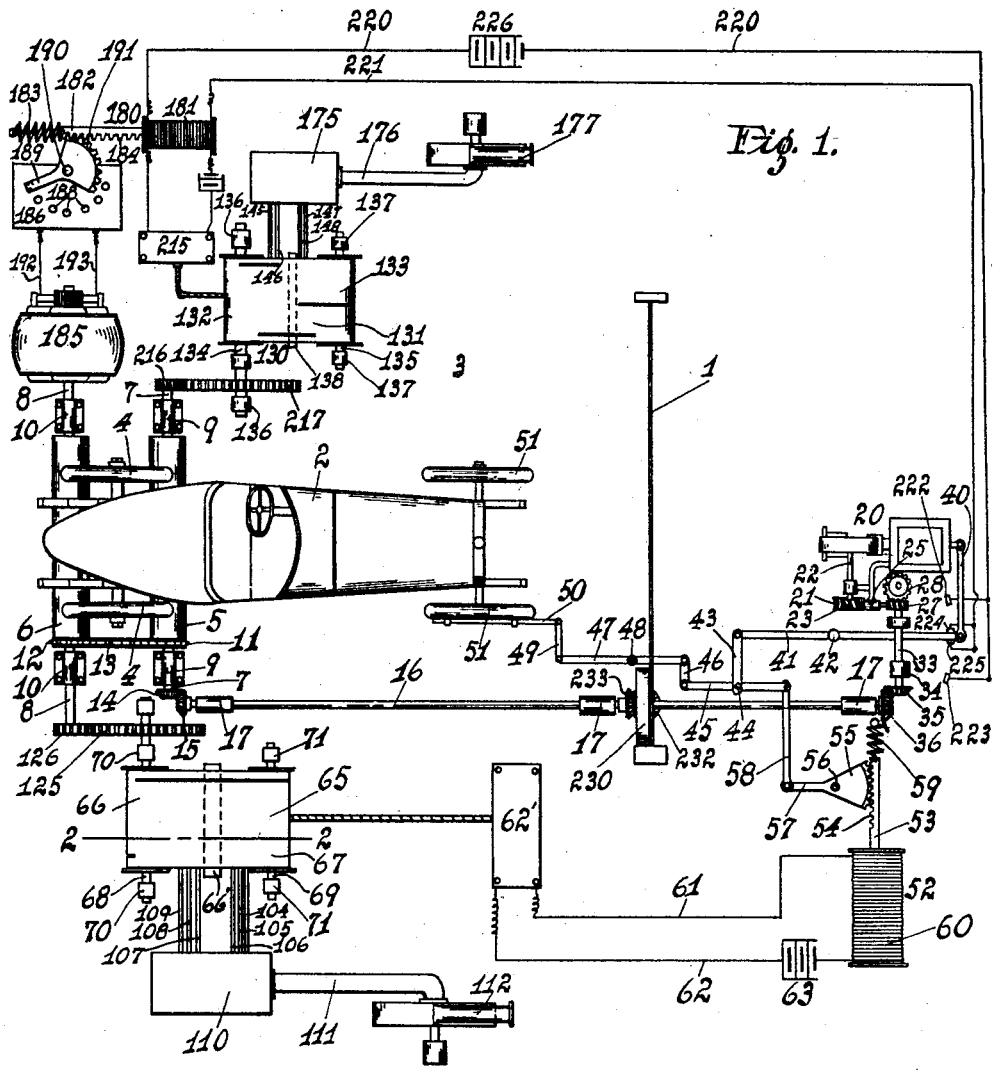
Figure 1 is a plan view of my invention.
Figure 2:
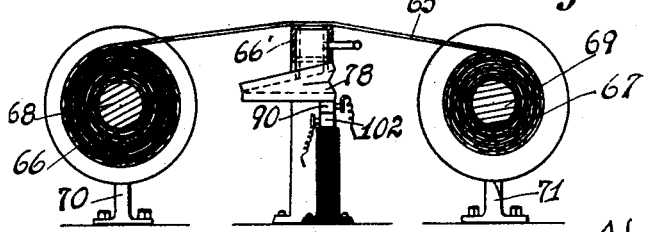
Fig. 2 is a sectional view taken on line 2—2 of Fig. 1.
Figure 6:
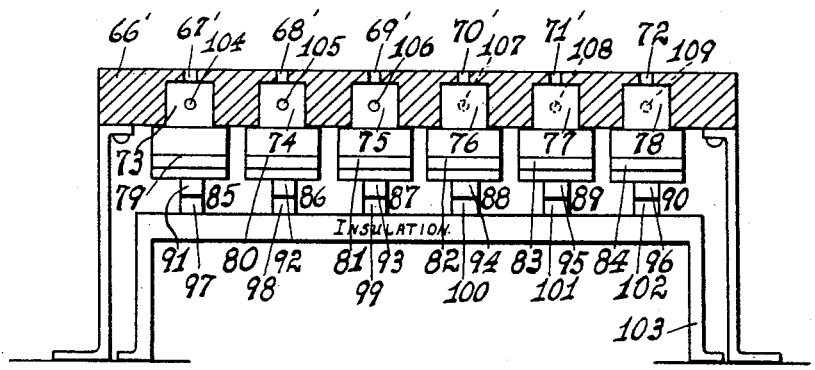
Fig. 6 is a side elevation of the tracker board 66 which controls the solenoid for turning the projector.
Figure 7:
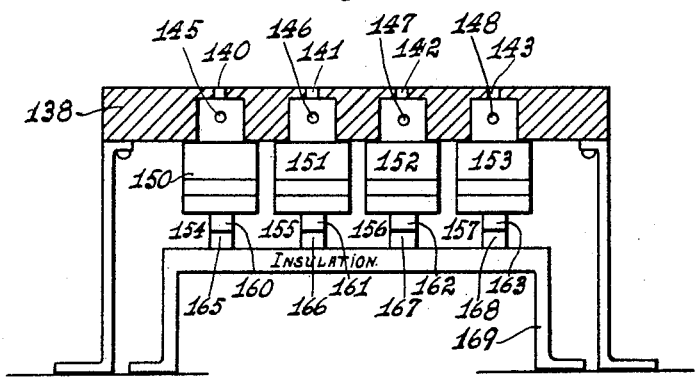
Fig. 7 is a side view of the tracker board 138 of the speed controlling device.

In the drawing 1 indicates a moving picture screen and 2 an automobile on the stage 3 in front of the screen with its front wheels facing the screen and its rear wheels facing the audience. The rear wheels 4 of the automobile rest upon a pair of horizontal rollers 5 and 6 secured on shafts 7 and 8 journaled in bearings 9 and 10 on the stage. Sprockets 11 and 12 are secured on the shafts 6 and 7 over which sprockets travels a chain 13.

On one end of shaft 7 is secured a beveled pinion 14 which meshes with a beveled pinion 15 secured on one end of a horizontal shaft 16 journaled in bearings 17 secured to the stage 3. A moving picture projector 20 is mounted on the stage behind the screen. A spur gear 21 is secured on the lower reel shaft 22 of said projector, which gear meshes with a worm 23 secured on a horizontal shaft 24 journaled in a bearing 25 on the projector stand 26. Another worm 27 is secured on the shaft 24 which meshes with a spur gear 28 secured on the upper end of a vertical shaft 29 journaled in a bearing 30 on the projector stand. A bevel pinion 31 is secured on the lower end of vertical shaft 29, said pinion meshing with a bevel pinion 32 on one end of a horizontal shaft 33 which is journaled in bearings 34 secured to the stage 3. A bevel pinion 35 is secured on the other end of shaft 33 and meshes with a bevel pinion 36 on the adjacent end of shaft 16. To the back of the projector 20 is pivoted one end of a link 40, the other end of said link being pivoted to the rear end of a horizontal lever 41 pivoted at 42 to the stage. The forward end of lever 41 is connected to one end of a link 43, the other end of said link being pivoted at 44 to a lever 45. The lever 45 is connected at its forward end to one end of a link 46, the other end of said link being connected to the rear end of a lever 47 which is pivoted at 48 to the stage. The forward end of lever 47 is connected to one end of a link 49, the other end of said link being connected to an arm 50 secured to one of the front wheels 51 of the automobile 2.

A solenoid 52 is mounted on the stage, on the core 53 of which is a rack 54 which meshes with a segmental gear 55 pivoted at 56 to the stage. An arm 57 projecting from the segmental gear 54 is connected to one end of a link 58, the other end of said link being connected to the rear end of lever 45. A spring 59 is secured at one end to the stage and at the other end to the outer end of solenoid core 53, said spring tending to withdraw the core from the solenoid coil 60. The solenoid coil is connected at its ends to leads 61 and 62 which lead into a resistance box 62 mounted on the stage, a battery 63 being connected in series to the lead 62. A projector turning device for shifting the picture to one side or the other of the screen as the road accordingly turns, includes a road turn record 65 wound at its ends on rolls 66 and 67 which are secured on shafts 68 and 69 respectively journaled in bearings 70 and 71 secured to the stage. The record 65 travels over a pneumatic tracker board 66', which is provided with six slots 67', 68', 69', 70', 71' and 72 with which the perforations of the record 65 register. Tubes 73, 74, 75, 76, 77 and 78 extend upwardly into the tracker board and communicate at their upper ends with slots 67', 68', 69', 70', 71' and 72 respectively.

Pneumatics 79, 80, 81, 82, 83 and 84 are respectively secured on the lower ends of tubes 73, 74, 75, 76, 77 and 78 with which tubes said pneumatics communicate. The pneumatics 79, 80, 81, 82, 83 and 84 respectively control electric switches 85, 86, 87, 88, 89 and 90 which switches respectively include contacts, 91, 92, 93, 94, 95 and 96 secured to the lower movable members of said pneumatics respectively and contacts 97, 98, 99, 100, 101 and 102 secured to a frame 103 mounted on the stage, which contacts are engaged by the contacts 91, 92, 93, 94, 95, and 96 when the switches 85, 86, 87, 88, 89 and 90 are closed. Tubes 104, 105, 106, 107, 108 and 109 are respectively connected at one end to pneumatic tubes 73, 74, 75, 76, 77 and 78 and at their other end to a vacuum box 110. A tube 111 leads from the vacuum box 110 to a vacuum pump 112. Leads 113, 114, 115, 116, 117 and 118 respectively connect to switch contacts 97, 98, 99, 100, 101 and 102 and to lead 62. One end of resistance coils 119, 120, 121, 122, 123 and 124 connect to switch contacts 91, 92, 93, 94, 95 and 96 respectively, the other end of said coils connecting to lead 61. On the shaft 68 is secured a gear 125 which meshes with a pinion 126 secured on the shaft 8.

A speed controlling device 130 for controlling the speed of the automobile and picture in accordance with the grade of the road includes a perforated speed resistance record 131 wound at its ends on rolls 132 and 133 secured on shafts 134 and 135 journaled in bearings 136 and 137 secured to the stage. The record 131 travels over a tracker board 138 which is provided with four slots 140, 141, 142 and 143 with which the record perforations are adapted to register. Tubes 145, 146, 147 and 148 extend upwardly into the tracker board 138 and communicate at their upper ends with the slots 140, 141, 142 and 143 respectively. Pneumatics 150, 151, 152 and 153 are mounted on the lower ends of tubes 145, 146, 147 and 148 and communicate therewith. The pneumatics 150, 151, 152 and 153 respectively control electric switches 154, 155, 156 and 157, which switches respectively include contacts 160, 161, 162 and 163 secured to the lower movable member of said pneumatics respectively and contacts 165, 166, 167 and 168 secured on a frame 169 mounted on the stage, the latter contacts being respectively engaged by the former contacts when said switches are closed. Tubes 170, 171, 172 and 173 are respectively connected at one end to tubes 145, 146, 147 and 148 respectively and at their other end to a vacuum box 175. A tube 176 leads from said vacuum box to a vacuum pump 177. A solenoid 180 is mounted on the stage, said solenoid including a coil 181 and a core 182 which reciprocates in said coil. A spring 183 is connected at one end to the stage and at its other end to the outer end of the core 182, said spring tending to withdraw the core from the coil. On the core 182 is a rack 184. The shaft 8 is the shaft of an electric dynamometer 185, the resistance of which is controlled by a rheostat 186 which includes a resistance coil 187, a plurality of contacts 188 connected to said coil at different points and a contact arm 189 pivoted at 190 to wipe said contacts 188 successively. The arm 189 carries a segmental gear 191 which meshes with rack 184. A lead 192 connects to one terminal of the dynamometer 185 and to the rheostat arm 189. A lead 193 connects to the other terminal of the dynamometer and to one terminal of a battery 194. A lead 195 connects to the other terminal of battery 194 and to one end of rheostat resistance coil 187. To the ends of the solenoid coil 181 are connected leads 200 and 201, a battery 202 being connected in series to the lead 201. Leads 205, 206, 207 and 208 are respectively connected to the contacts 165, 166, 167 and 168 and to lead 201. Resistance coils 210, 211, 212 and 213 are connected at one end to lead 200 and at their other end to switch contacts 160, 161, 162 and 163 respectively. The resistances 210, 211, 212 and 213 and battery 202 are located in resistance box 215. On shaft 7 is secured a pinion 216 which meshes with a gear 217 on roll shaft 134.

A speedometer 230 is mounted in front and at one side of the screen. On the lower end of the vertical shaft 231 of said speedometer is secured a beveled pinion 232 which meshes with a beveled pinion 233 secured on the shaft 16.

The operator sits in the automobile and drives it forwardly. The rear automobile wheels 4 rotate the rollers 5 and 6 and their shafts 7 and 8, gears 14, 216 and 126, and dynamometer 185. The motion picture projector 20 is driven from shaft 7 through the medium of beveled gears 14 and 15, shaft 16, beveled gears 36 and 35, shaft 33, beveled gears 32 and 31, shaft 29, gear 28, worm 27, shaft 24, worm 23 and gear 21. Through the medium of gears 126, and 125, shaft 68 and roll 66, the record 65 is drawn over the tracker board 66'. Through the medium of gears 216 and 217, shaft 134 and roll 132 the record 131 is drawn over the tracker board 138. Normally when the road on the picture is straight a perforation in the record 65 registers with the slot 70' in the tracker board 66' whereupon air enters pneumatic 82, expands it and closes switch 88 while the record closes the slots 67', 68', 69', 71' and 72 and the pump 112 exhausts the pneumatics 79, 80, 81, 83 and 84 and opens the switches 85, 86, 87, 89 and 90. The closing of switch 88 energizes the solenoid coil 60, the current passing from the battery 63, through lead 62, coil 60, lead 61, resistance 122, switch 88, lead 116 and lead 62 back to battery 63, while the opening of switches 85, 86, 87, 89 and 90 cuts out the resistances 119, 120, 121, 123 and 124. With the resistance 122 in the strength of the current in the solenoid draws the core 53 half way into the coil 60 against the tension of spring 59 into neutral position, in which position the solenoid, through the medium of rack 54, segmental gear 55, link 58, lever 45, link 43, lever 41 and link 40, holds the projector 20 in neutral position so that it projects its picture centrally of the screen 1. When a turn to the left in the road appears on the screen, the slot 70' is closed by the record and the perforations 69', 68' or 67' closed, the pneumatic 81, 80 or 79 is expanded and the switch 87, 86 or 85 is closed, which causes the current passing through the solenoid coil 52 to pass through the resistance 121, 120 or 119. As the resistances 121, 120 and 119 are progressively less than the resistance 122 the strength of solenoid 52 will be progressively more when these resistances are respectively included in the solenoid circuit and the solenoid core 53 will be progressively drawn greater distances into the solenoid coil 60. As the solenoid coil is thus drawn in, the projector 20 will be respectively turned and the picture on the screen shifted slightly, or farther or still farther to the left of the screen through the medium of segmental gear 55, arm 57, link 58, lever 45, link 43, lever 41 and link 40. When the picture is shifted to the right the driver of the automobile turns the front wheels 51 to the left until the projector 20 is turned back to central position through the medium of arm 50, link 49, lever 47, link 46, lever 45, link 43, lever 41 and link 40, and the picture returned to its normal central position on the screen. The turning of the automobile wheels and the shifting of the picture in this manner gives the automobile the appearance of turning to the left on the turn of the road in this direction. The record then closes the slots 69', 68' and 67' and opens the slot 70', cutting out resistances 121, 120 and 119 and bringing in resistance 122, while the driver of the automobile turns the front wheels back straight, thus bringing the front wheels of the automobile and the parts connecting them and the projector back to normal position as shown in Fig. 1. When a turn to the right in the road appears on the screen, the record 65 closes the slot 70'' and opens either the slot 71' or 72 which admits air into and expands pneumatics 83 or 84 which in turn closes switch 89 or 90 and causes the current in the solenoid 52 to pass through resistance 123 or 124. As said resistances are greater than resistance 122, when either is included in the solenoid circuit, the solenoid core is drawn farther out of the solenoid coil 60 by spring 59 than when the resistance 122 is included, which causes the projector 20 to turn to the right through the medium of the rack 54, segmental gear 55, arm 57, link 58, lever 45, link 43, lever 41 and link 40 which shifts the picture on the screen to the right. The resistance 124 being greater than resistance 123 when the solenoid circuit includes it, the core 53 will be drawn out of the coil a greater distance than when the resistance 123 is included and the projector 20 will be turned and the picture shifted farther to the right. When the picture is shifted to the right, the driver of the automobile turns the front wheels 51 of the automobile to the right which, through the medium of the arm 50, link 49, lever 47, link 46, lever 45, link 43, lever 41 and link 40, turns the projector and shifts the picture back to central position. This gives the automobile the appearance of turning to the right on a turn of the road in this direction. The record 65 then closes the slots 71' and 72 and opens the slot 70', cutting out resistances 123 and 124 and bringing in resistance 122 while the driver of the automobile turns the front wheels back straight, thus bringing the automobile front wheels and the parts connecting the projector back to normal position as shown in Fig. 1.

Normally and when the road in the picture is level little resistance is offered by the dynamometer to the automobile through shaft 8 and rollers 5 and 6, inasmuch as no current passes through solenoid 180 and the spring 183 holds the solenoid core 182 out of the coil 181 and the rheostat arm 189 at the forward end of resistance 187 so that the current from battery 194 has to pass through the entire resistance 187 which reduces the voltage in the dynamometer to a minimum. When a grade appears on the road of the picture, the record 131 uncovers one of the slots 140, 141, 142 or 143 according to the percent of the grade which expands pneumatics 150, 151, 152 or 153 and closes switch 154, 155, 156 or 157, which includes the resistance 210, 211, 212 or 213 in the circuit from the battery 202 through solenoid coil 181 and causes the solenoid core 182 to be drawn into the coil 181 and the rheostat arm 189 to wipe the contacts 188 and cut out a part of the resistance 187, the greatest amount of resistance being cut out when resistance 210 is included and progressively smaller amounts being cut out when the resistances 211, 212 or 213 are included. The cutting out of a smaller or greater amount of the resistance 187 increases the voltage in the dynamometer 185 which correspondingly applies a smaller or greater amount of resistance to the shaft 8, rollers 5 and 6 and the automobile 1, and reduces the speed of the automobile and the projector 20 a small or greater amount, the speed of the projector being reduced inasmuch as it is driven by the automobile as above described. This gives the natural appearance of the automobile slowing down while going up a hill. When the hill is ascended the record 131 covers the slots 140 to 143 inclusive and cuts out resistances 210 to 213 inclusive, and the spring 183 draws out the core 182 and brings in the resistance 187 which causes the dynamometer to cease its resistance to the automobile.

If the driver of the automobile should fail to turn the front wheels of the automobile when the projector 20 is turned by the solenoid 52, the contact 224 or 225 will engage the contact 222 or 223 and close the circuit from battery 226 through lead 220, contact 222 and 224 or contact 223 and 225, lead 221, solenoid coil 181 and lead 220 back to battery 226. The solenoid core 182 will then be drawn into the coil 181 and the rheostat arm 189 over the contacts 188 until the resistance 187 is cut out, whereupon the dynamometer 185 applies great resistance to the shaft 8 and automobile 1 which brings the automobile and the projector and picture to a stop with the automobile appearing to have run to one side off the road. In this event, the automobile is considered as penalized. When the driver turns the front wheels 51 of the automobile and the projector back into registration the circuit from battery 226 is broken and the race or tour is continued.

The speed of the automobile is indicated to the audience by the speedometer 230.

Having described my invention, I claim:

1. In combination, a screen, a moving picture projector, an automobile in front of said screen, means whereby the projector is driven by the automobile, means for turning the projector, means operated by turning the front wheels of the automobile to turn said projector and shift the picture back to their central position, and means for applying resistance to the automobile which tends to reduce its speed and the speed of the projector.

2. In combination, a screen, a moving picture projector for projecting a picture of a road from an automobile traveling along said road, an automobile in front of said screen and appearing in the road of the picture, means driven by the automobile for driving the projector, means for turning the projector and shifting the picture to one side of the screen or the other when a turn in one direction or the other in the road appears in the picture, means actuated by turning the front wheels of the automobile to turn said projector and shift the picture back to central position, and means for applying resistance to the automobile and tending to reduce the speed thereof and the speed of the picture when a grade appears in the road.

3. In combination, a screen, a moving picture projector for projecting a picture of a road from an automobile traveling along said road, an automobile in front of said screen and appearing in the road of the picture, means driven by the automobile for driving the projector, means for turning the projector and shifting the picture to one side of the screen or the other when a turn in one direction or the other in the road appears in the picture, means actuated by turning the front wheels of the automobile to turn said projector and shift the picture back to central position, means for applying resistance to the automobile and reducing the speed thereof and the speed of the picture when a grade appears in the road, and means for applying resistance to and slowing down or stopping the automobile and picture when the driver fails to turn the front wheels of the automobile to turn the projector and shift the picture back to central position.

4. In combination, a screen, a moving picture projector, an automobile in front of said screen, means whereby the projector is driven by the automobile, means for turning the projector, means operated by turning the front wheels of the automobile to turn said projector and shift the picture back to their central position, means for applying resistance to the automobile to tend to reduce its speed and the speed of the projector, and a speedometer mounted where the audience may see it for indicating the speed of the automobile.

5. In combination, a screen, a moving picture projector for projecting a picture of a road on the screen, an automobile mounted in front of the screen, means whereby the projector is driven by the automobile in accordance with the speed of the automobile, means for turning the projector different degrees to shift the picture to different positions on the screen, means operated by turning the front wheels of the automobile to turn the projector and shift the picture back to their central position, and means for applying resistance to the automobile to tend to reduce the speed thereof and the speed of the projector.

6. In combination, a screen, a moving picture projector, an automobile in front of said screen, means whereby the projector is driven by the automobile, means for turning the projector, means operated by turning the front wheels of the automobile to turn said projector and shift the picture back to their central position, and means for applying different degrees of resistance to the automobile to tend to reduce the speed thereof and the speed of the automobile to different degrees.

7. In combination, a screen, a moving picture projector for projecting a picture of a road on the screen, an automobile mounted in front of the screen, means whereby the projector is driven by the automobile in accordance with the speed of the automobile, means for turning the projector different degrees to shift the picture to different positions on the screen, means operated by turning the front wheels of the automobile to turn the projector and shift the picture back to their central position, and means for applying different degrees of resistance to the automobile to reduce the speed thereof and the speed of the picture to different degrees.

In testimony whereof I affix my signature.

ELMER H. HERBERT.